United States Patent [19]

Miyagawa

[11] Patent Number: 4,832,446
[45] Date of Patent: May 23, 1989

[54] LASER OPTICAL SYSTEM

[75] Inventor: Ichirou Miyagawa, Kanagawa, Japan

[73] Assignee: Fuji Photo Co., Ltd., Kanagawa, Japan

[21] Appl. No.: 127,018

[22] Filed: Nov. 27, 1987

[30] Foreign Application Priority Data

Nov. 28, 1986 [JP] Japan ............................ 61-283647
Nov. 28, 1986 [JP] Japan ............................ 61-283648
Aug. 7, 1987 [JP] Japan ............................ 62-197734

[51] Int. Cl.$^4$ ............................................ G02B 27/42
[52] U.S. Cl. .............................. 350/162.12; 350/3.68; 372/109
[58] Field of Search .................. 372/103, 19, 703, 109; 350/962, 12, 9, 3.75, 3.68, 3.67, 162 N, 162 R

[56] References Cited

U.S. PATENT DOCUMENTS

| | | | |
|---|---|---|---|
| 3,868,637 | 2/1975 | Schiller | 350/162.12 |
| 3,900,884 | 8/1975 | St. John | 350/3.75 |
| 4,074,361 | 2/1978 | Clow | 372/19 |
| 4,089,589 | 5/1978 | Brockman et al. | 350/162.12 |
| 4,158,176 | 6/1979 | Hunt et al. | 372/103 |
| 4,464,021 | 8/1984 | Brown et al. | 372/703 |
| 4,656,641 | 4/1987 | Scifres et al. | 372/9 |

*Primary Examiner*—Leon Scott, Jr.
*Attorney, Agent, or Firm*—Sughrue, Mion, Zinn, Macpeak & Seas

[57] ABSTRACT

A laser optical system comprises a laser beam source, a beam diameter adjusting member disposed in the optical path of a laser beam emitted by the laser beam source and having an aperture through which only the center portion of the laser beam is to be passed, a converging lens for converging the laser beam passing through the aperture of the beam diameter adjusting member, and a spatial filter disposed in the vicinity of a convergence position of the laser beam for restricting the passage of the laser beam in at least one-dimension and allowing passage of only a zero-order light component converged to a predetermined position. Alternatively, the laser optical system comprises a laser beam source, and a density distribution filter disposed in the optical path of the laser beam emitted by the laser beam source for allowing passage of only the center portion of the laser beam in at least one-dimensional direction and gradually decreasing the transmittance toward the peripheral portion of the laser beam.

7 Claims, 6 Drawing Sheets

LASER OPTICAL SYSTEM

BACKGROUND OF THE INVENTION

1. Field of the Invention

This invention relates to a laser optical system provided with a laser beam source. This invention particularly relates to a laser optical system wherein no side lobe is generated around a convergence spot when a laser beam emitted by the laser beam source is converged.

2. Description of the Prior Art

Laser optical systems have heretofore been widely used as, for example, a means for generating a scanning light beam in scanning recording apparatuses and scanning read-out apparatuses. Among laser optical systems, laser optical systems using a semiconductor laser as the laser beam source are advantageous in that the semiconductor laser is smaller, cheaper and consumes less power than a gas laser or the like, and in that direct analog modulation wherein the optical output is changed by control of the drive current can be effected,. Therefore direct modulation may be carried out by the use of signals generated in accordance with image information in the case where the laser optical system is used in a scanning recording apparatus.

In the aforesaid laser optical system, a beam diameter adjusting plate having an aperture through which only the laser beam portion at the center of the laser beam emitted by the laser beam source is to be passed is often disposed in the optical path of the laser beam. The beam diameter adjusting plate is used for various purposes, for example for increasing the focal depth at the time the laser beam is converged, as disclosed in Japanese Patent Publication No. 58(1983)-20015. Also, in the case where a semiconductor laser is used as the laser beam source, the beam diameter adjusting plate is often disposed so that the light in a low output region of the laser beam emitted by the semiconductor laser can also be utilized without increasing the diameter of the convergence spot at the convergence position. The relationship between the output of the semiconductor laser and the diameter of the convergence spot and the effects of the beam diameter adjusting plate will be described hereinbelow.

It has heretofore been known that laser light emitted by a semiconductor laser may be classified into laser oscillation light and light in the natural light emission region. FIG. 8 shows the relationships between the drive current for the semiconductor laser on one hand and the laser oscillation light and the light in the natural light emission range on the other hand. In FIG. 8, line "a" indicates the relationship between the drive current and output of the light in the natural light emission region (hereinafter referred to as natural emission light), and line "b" indicates the relationship between the drive current and the output of the laser oscillation light. As shown, in the case where a drive current is applied to the semiconductor laser, no laser oscillation light is emitted and only the natural emission light is emitted until the level of the drive current exceeds a threshold current Io. As the level of the drive current increases, the output level of the natural emission light increases gradually. However, the laser oscillation light starts being generated when the level of the drive current exceeds the threshold current Io, and the output of the laser oscillation light becomes large thereafter. At this time, the ratio of the output of the natural emission light to the output level of the laser beam as a whole diminishes, and substantially laser oscillation light alone is emitted. The relationship between the level of the drive current and total amount of natural emission light and the laser oscillation light generated by the semiconductor laser is indicated by curve "c".

The natural emission light contains various angle components as compared with the laser oscillation light, and therefore the natural emission light cannot be converged to a spot diameter as small as the spot diameter of the laser oscillation light. Therefore, in the case where the semiconductor laser optical system is used in a scanning recording apparatus wherein the recording light must be modulated over a wide dynamic range and even light beams of the low output region in which the natural emission light is predominant must be utilized, the beam diameter in the low output level region increases and the spatial resolution of scanning deteriorates. Accordingly, in Japanese Patent Application No. 61(1986)-196352, the applicant proposed a semiconductor laser optical system provided with a beam diameter adjusting plate having an aperture through which only the center portion of the laser beam is to be passed, on the basis of the fining that the diameter of the convergence spot can be reduced for natural emission light as well when the beam diameter adjusting plate is disposed in the optical path of the laser beam.

As mentioned above, the beam diameter adjusting plate is used for increasing the focal depth, or, in the case of the semiconductor laser, for preventing the diameter of the convergence spot of the natural emission light from increasing. In the case where a lens such as a collimator lens disposed in the optical path has a diameter smaller than the diameter of the incident light beam, the lens itself may act in the same manner as an aperture and may substantially constitute the beam diameter adjusting member.

However, in the case where the beam diameter adjusting member mentioned above is disposed in the optical path of the laser beam emitted by the laser beam source, a part of the laser beam is eclipsed by the contour portions of the aperture of the beam diameter adjusting member. As a result, when the laser beam after passage through the beam diameter adjusting member is converged, a weak first-order light component, a weak second-order light component and the like are generated as side lobes around a zero-order light component converged to a predetermined position. When such side lobes are generated, various problems consequently arise, for example image ghosts appear in the case where the laser optical system is used in a scanning recording apparatus and recording of the image information is carried out by use of the converged laser beam.

SUMMARY OF THE INVENTION

The primary object of the present invention is to provide a laser optical system provided with a beam diameter adjusting means wherein a converged laser beam free of the adverse effects of side lobes is obtained.

Another object of the present invention is to provide a laser optical system wherein only the center portion of the laser beam is employed and no side lobes are generated when this laser beam portion is converged.

The present invention provides a laser optical system comprising:

(i) a laser beam source, (ii) a beam diameter adjusting member disposed in an optical path of a laser beam omitted by said laser beam source and having an aperture through which only the center portion of said laser beam is allowed to pass, (iii) a converging lens for converging the laser beam passing through said aperture of said beam diameter adjusting member, and (iv) a spatial filter disposed in the vicinity of a convergence position of said laser beam for restricting the passage of said laser beam in at least one-dimensional direction and allowing passage of only a zero-order light component converged to a predetermined position.

The term "aperture of a beam diameter adjusting member" as used herein means an aperture sized such that a part of the laser beam is eclipsed by contour portions of the aperture, and embraces, for example, a slit on a lens having a diameter smaller than the diameter of the incident laser beam. Also, the phrase "in the vicinity of a convergence position" as used herein means a position within a range effective for elimination of side lobes and includes the convergence position.

The present invention also provides a laser optical system comprising:

(i) a laser beam source, and (ii) a density distribution filter disposed in an optical path of a laser beam emitted by said laser beam source for allowing passage of only the center portion of said laser beam in at least one-dimensional direction and gradually decreasing the transmittance toward the peripheral portion of said laser beam.

In the second-mentioned laser optical system in accordance with the present invention, the density distribution filter may be of an absorption type for absorbing light at a high-density portion, or it may be of a reflection type for reflecting light at the high-density portion.

With the first-mentioned laser optical system in accordance with the present invention wherein the laser beam emitted by the laser beam source and passing through the aperture of the beam diameter adjusting member is converged and the spatial filter is disposed at the convergence position of the laser beam, side lobes can be cut off, and therefore a converged laser beam constituted by the zero-order light component alone can be obtained by again converging the laser beam passing through the spatial filter. Accordingly, recording or the like of an image free of ghosts can be achieved by use of the converged laser beam free of side lobes.

With the second-mentioned laser optical system in accordance with the present invention wherein the density distribution filter adjusts the passage of the laser beam in accordance with the optical density thereof, there is not risk of a part of the incident laser beam being eclipsed as in the case of the use of the beam diameter adjusting member having an aperture and no side lobe is generated when the laser beam is converged after passage through the density distribution filter. Also, the density distribution of the density distribution filter can be selected as desired, and therefore the shape of the laser beam passing through the density distribution filter can easily be adjusted as desired.

Therefore, with the second-mentioned laser optical system in accordance with the present invention, the beam diameter can be adjusted efficiently by use of the density distribution filter without side lobes being generated. Accordingly, by converging the laser beam passing through the density distribution filter, the focal depth can be increased and blurring of the beam diameter can be eliminated. Thus a good converged laser beam can be obtained at the convergence position.

DESCRIPTION OF THE PREFERRED EMBODIMENTS

The present invention will hereinbelow be described in further detail with reference to the accompanying drawings.

Figure 1:
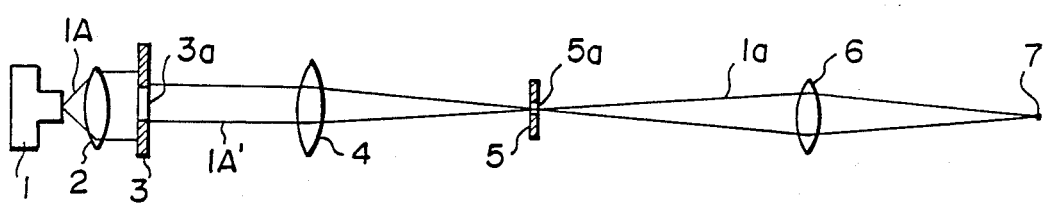
FIG. 1 is a side view showing a semiconductor laser optical system, as an embodiment of the first laser optical system in accordance with the present invention.

Referring to FIG. 1, a current is applied to a semiconductor laser 1, and the semiconductor laser 1 emits a laser beam 1A, with the amount of light emission varying in accordance with the level of the current. The laser beam 1A generated by the semiconductor laser 1 is collimated by a collimator lens 2 disposed in the optical path, and then impinges upon a beam diameter adjusting plate 3 having an aperture 3a at its center portion which allows the passage of only that part 1A' at the center portion of the laser beam 1A.

Figure 2:
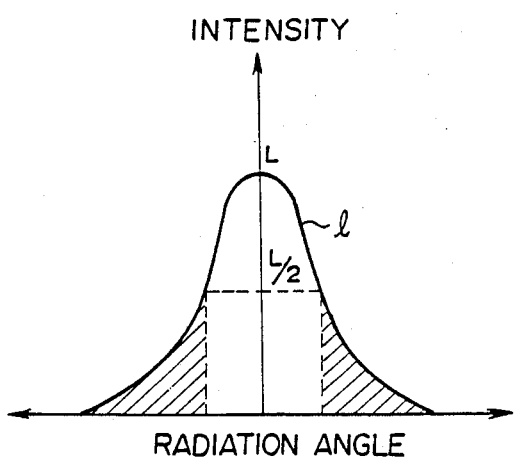
FIG. 2 is a graph showing the intensity distribution in accordance with the radiation angle of the laser oscillation light.

The semiconductor laser 1 emits natural emission light and laser oscillation light as mentioned above in accordance with the level of the applied current. As shown in FIG. 2, the laser oscillation light has a predetermined intensity distribution in a predetermined radiation angular range, and the intensity in the middle of the range reaches a maximum intensity L. The laser oscillation light has an elliptical cross-sectional shape wherein the spread angle is different as between the longitudinal and transverse directions, and the gradient of the curve l differs as between the longitudinal and transverse directions. On the other hand, the natural emission light contains various angular components and is also radiated in directions different from the directions of radiation of the laser oscillation light.

Figures 3A, 3B:
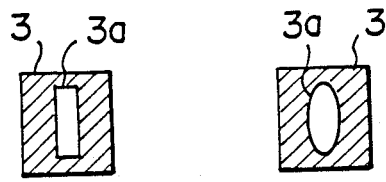
FIGS. 3A and 3B are schematic views showing examples of the shapes of apertures of beam diameter adjusting plates.

The beam diameter adjusting plate 3 is used for decreasing the diameter of the convergence spot of the laser beam in the low output level region, wherein the natural emission light is predominant, to a value close to the diameter of the convergence spot of the laser oscillation light. The diameter of the convergence spot of the laser beam in the low output region can be made smaller as the size of the aperture 3a is made smaller. The aperture 3a of the beam diameter adjusting plate 3 is formed so that the size of the aperture 3a in the longitudinal direction and the size thereof in the transverse direction are respectively within the range of 0.2 to 1.5 where value 1 represents a size of aperture through which laser oscillation light within the range from maximum intensity L to intensity L/2, i.e. one-half of the maximum intensity, in the intensity distribution as shown in FIG. 2, can pass. The aperture 3a may be shaped in any form as long as the amount of the laser beam 1A′ which is allowed to pass through the aperture 3a is adjusted to be within the aforesaid range. For example, the shape of the aperture 3a may be rectangular as shown in FIG. 3A, or elliptical as shown in FIG. 3B. After passing through the beam diameter adjusting plate 3, the laser beam 1A′ is converged to an ultimate convergence position 7 via a plurality of optical elements disposed in the optical path as will be described later. When the size of the aperture 3a is 0.2, the diameter of the convergence spot at an output of 0.02 mW in which the natural emission light is predominant is 1.05 where the value is taken as the diameter of the convergence spot at an output of 3 mW in which the laser oscillation light is predominant. Where the size of the aperture 3a is 1.5, the diameter of the convergence spot at the output of 0.02 mW, in which the natural emission light is predominant, is 1.6. Thus, when the size of the aperture 3a is within the range of 0.2 to 1.5 as defined above, the effect of decreasing the diameter of the convergence spot can be substantially achieved, as compared with the case where no beam diameter adjusting plate is used. As the aperture 3a is reduced, the ratio of the amount of the laser beam 1A′ passing through the beam diameter adjusting plate 3 to the amount of the laser beam 1A decreases. However, even in the case where the size of the aperture 3a is 0.2, the passage ratio of the laser oscillation light is 20%, a value which is allowable depending on the purpose of use. In the case where the size of the aperture 3a is 1.5, the passage ratio of the laser oscillation light is nearly 100%. Therefore, the size of the aperture 3a should be adjusted to an arbitrary value within the range of 0.2 to 1.5 as defined above, in accordance with the necessary accuracy of the diameter of the convergence spot and the necessary optical amount.

Figures 4A, 4B:
FIGS. 4A and 4B are schematic views showing examples of the shapes of apertures of spatial filters.
Figure 5:
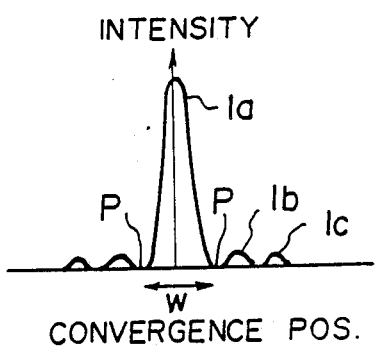
FIG. 5 is a graph showing the intensity distribution of the converged laser beam before passage through the spatial filter.

When the laser beam 1A′ passing through the aperture 3a of the beam diameter adjusting plate 3 is converged directly, side lobes of a first-order light component 1b (FIG. 5) and a second-order light component 1c are generated around a zero-order light component 1a, which is converged to a predetermined position, by the laser beam portions eclipsed by the contour portions of the aperture 3a. Therefore, in this embodiment, a converging lens 4 is disposed at the rear of the beam diameter adjusting plate 3 for converging the laser beam 1A′ to a convergence position prior to the aforesaid ultimate convergence position 7, and a spatial filter 5 is disposed at said convergence position for cutting off the side lobes. By way of example, as shown in FIG. 4A or FIG. 4B, the spatial filter 5 is constituted by an light-shielding plate having a aperture 5a which passes the zero-order light component but intercepts the first-order light component 1b and the second-order light component 1c. The shape of the aperture 5a is selected in accordance with the aperture a of the beam diameter adjusting plate 3. In the case where the beam diameter adjusting plate 3 adjusts the laser beam in two-dimensions or directions as mentioned above, side lobes are also generated in two dimension or directions, and therefore the shape of the aperture 5a should be such that side lobes can be cut off in two-dimensional directions. For example, in the case where the aperture 3a of the beam diameter adjusting plate 3 is rectangular as shown in FIG. 3A, the aperture 5a of the spatial filter 5 should also be rectangular as shown in FIG. 4A. In the case where the aperture 3a of the beam diameter adjusting plate 3 is elliptical as shown in FIG. 3B, the aperture 5a of the spatial filter 5 should also be elliptical as shown in FIG. 4B. Also, the laser beam 1A′ passing through the aperture 3a of the beam diameter adjusting plate 3 is less condensed in the longitudinal direction of the aperture 3a, and therefore the beam diameter adjusting plate 3 and the spatial filter 5 are disposed so that the longitudinal direction of the aperture 3a and the longitudinal direction of the aperture 5a intersect normal to each other. A dark point P is present between the zero-order light component and the firstorder light component as shown in FIG. 5, and the width of the aperture 5a in each of the two-dimensional directions should preferably be adjusted to a value within the range of $W \pm W/10$ wherein W denotes the width between the dark points P. In the case where the width of the aperture 5a is within this range, the first-order light component passes through the aperture 5a, and the problem whereby a part of the zero-order light component is eclipsed by the contour portions of the aperture 5a, to disturb the shape of the convergence spot formed by the laser beam when converged again, does not arise.

Figure 6:
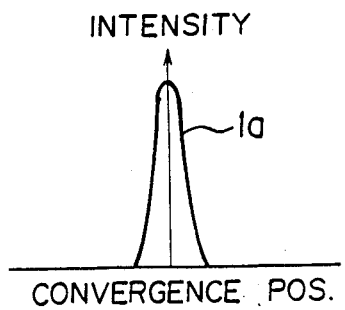
FIG. 6 is a graph showing the intensity distribution of the converged laser beam after passage through the spatial filter.

The zero-order light component (laser beam) 1a passing through the spatial filter 5 and diverging is again converged by a converging lens 6 and forms an image at the ultimate convergence position 7. At the convergence position 7, the laser beam 1a is converged to a small spot even in the low output level region owing to the effects of the beam diameter adjusting plate 3, and forms a converged beam free from side lobes as shown in FIG. 6 owing to the effects of the spatial filter 5. The spatial filter is not limited to the light-shielding plate provided with an opening as in the aforesaid embodiment, and may be a density distribution filter for selectively transmitting only the center portion of the laser beam 1A. In the case where the beam diameter adjusting plate 3 carries out laser beam adjustment in only one dimensional direction, side lobes are generated only in the one direction, and therefore a spatial filter for filtering the incident laser beam only in the one dimensional direction may be used.

An example of the optical scanning apparatus wherein the above optical system is employed will hereinbelow be described with reference to FIG. 7.

Figure 7:
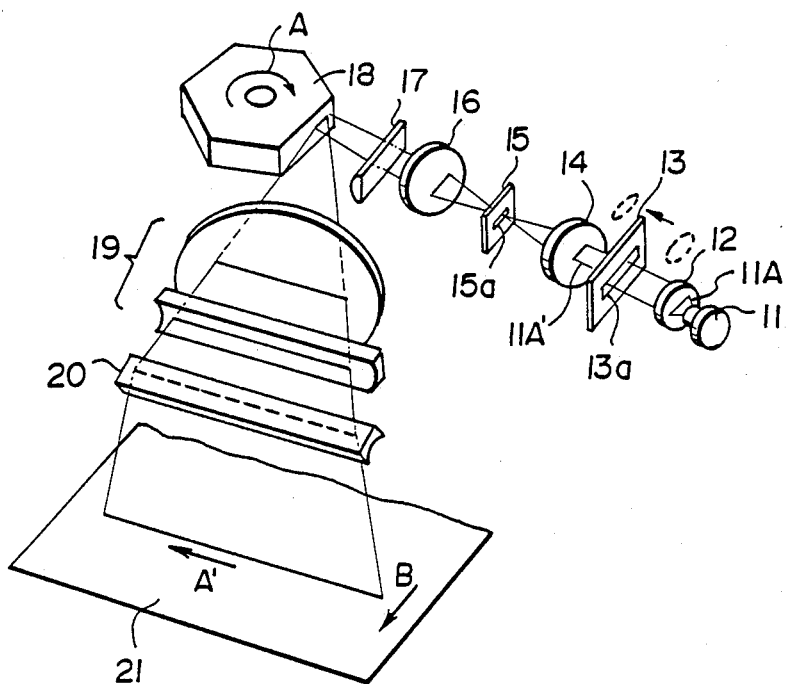
FIG. 7 is a perspective view showing an optical scanning apparatus wherein the first laser optical system in accordance with the present invention is utilized.
Figure 8:
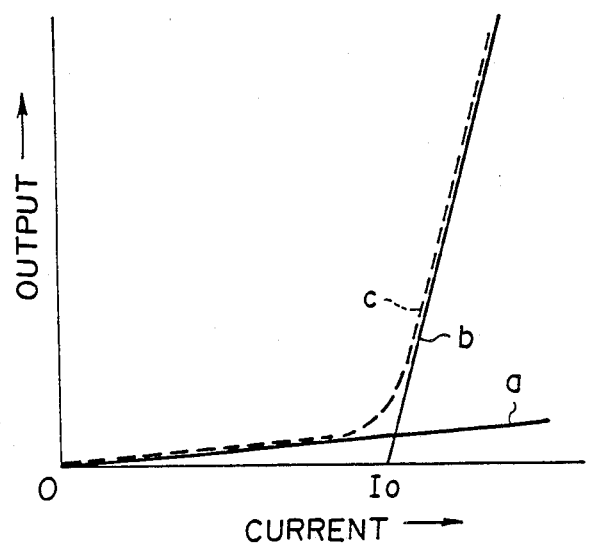
FIG. 8 is a graph showing the relationships between the drive current for a semiconductor laser and the output of natural emission light and the output of laser oscillation light.

In FIG. 7, a laser beam 11A emitted by a semiconductor laser 11 is collimated by a collimator lens 12, and is then made to impinge upon a beam diameter adjusting plate 13 having an aperture 13a. The laser beam 11A has a horizontally long elliptical beam shape as indicated by the broken line in FIG. 7, and the aperture 13a is formed to restrict the passage of the laser beam 11A therethrough only in the shorter axis direction (i.e. in the vertical direction in FIG. 7). Therefore, the laser beam 11A' passing through the beam diameter adjusting plate 13 has a beam shape contracted vertically as compared with the beam shape of the laser beam 11A. The laser beam 11A' is then converged by a converging lens 14 disposed in the optical path, and side lobes are eliminated by a spatial filter 15 disposed at the convergence position. The side lobes of the laser beam 11A' have been generated only in the vertical direction, and the aperture 15a of the spatial filter 15 has a width suitable for eliminating the side lobes as mentioned above only in the vertical direction. The width of the aperture 15a in the horizontal direction is larger than the beam diameter of the laser beam 11A'. The laser beam 11A' passing through the spatial filter 15 is collimated by a spherical lens 16, and is then converged by a cylindrical lens 17 only in the vertical direction. The laser beam 11A' is thus made to impinge upon a rotating polygonal mirror 18, which is rotating in the direction indicated by the arrow A, as a linear image normal to the drive axis of the rotating polygonal mirror 18. The rotating polygonal mirror 18 reflects and deflects the laser beam 11A' in the main scanning direction, and the deflected laser beam 11A' is passed through an fθ lens 19 constituted by a combination of two lenses. The deflected laser beam 11A' is then passed through a cylindrical mirror 20 disposed in the optical path to extend the same in the main scanning direction, and repeatedly scans a surface 21, which is being conveyed in a sub-scanning direction indicated by the arrow B, in the main scanning direction in the direction indicated by the arrow A'. The cylindrical mirror 20 converges the incident laser beam 11A' only in the sub-scanning direction on the surface 21 which is to be scanned, and the distance between the fθ lens 19 and the surface 21 which is to be scanned is adjusted to be equal to the focal length of the fθ lens 19 as a whole. Thus in this optical scanning apparatus, the cylindrical lens 17 and the cylindrical mirror 20 are disposed as indicated, and the laser beam 11A' is converged onto the rotating polygonal mirror 18 only in the subscanning direction. Therefore, even though surface inclination or axial deviation may arise with the rotating mirror 18, the scanning position of the laser beam 11A' on the surface 21 which is to be scanned does not deviate in the sub-scanning direction, and scanning lines free of splits in the sub-scanning direction can be formed at equal intervals. Also, in such an optical scanning apparatus, high accuracy in the diameter of the convergence spot on the surface 21 which is to be scanned is required particularly in the sub-scanning direction, and side lobes in the sub-scanning direction must be eliminated as far as possible since ghosting appears in the image when side lobes are generated in the sub-scanning direction. In the optical scanning apparatus shown in FIG. 7, the diameter of the convergence spot is adjusted in the vertical direction, which corresponds to the sub-scanning direction, by the beam diameter adjusting plate 13 in the optical path prior to the impingement of the laser beam 11A' upon the rotating mirror 18, and side lobes in the vertical direction are eliminated by the spatial filter 15. Therefore, scanning can be carried out accurately on the surface 21 so that no beam blur or side lobe is generated in the sub-scanning direction.

Though an embodiment of a first laser optical system in accordance with the present invention is described above taking a semiconductor laser optical system as an example, the first laser optical system in accordance with the present invention is also applicable to other laser optical systems wherein a beam diameter adjusting member provided with an aperture is disposed in the optical path for the purpose of increasing the focal depth or for other purposes, and thus the laser beam source is not limited to a semiconductor laser. Also, the desirable size of the aperture of the beam diameter adjusting member varies in accordance with the purpose of the adjustment of the beam diameter. The beam diameter adjusting member is not limited to a member disposed independently for the purpose of adjusting the beam diameter. For example, in the case where the diameter of the collimator lens is adjusted to be smaller than the diameter of the incident laser beam, the collimator lens acts in the same manner as the beam diameter adjusting member. Also in such a case, the spatial filter in the first laser optical system in accordance with the present invention is effective as a means of eliminating side lobes.

Figure 9:
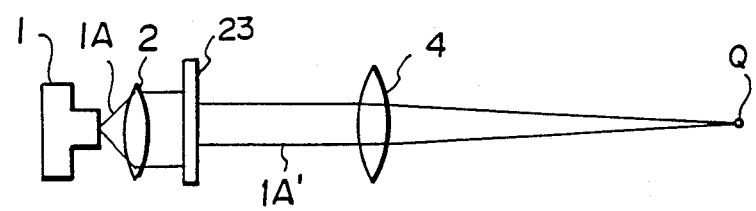
FIG. 9 is a side view showing a semiconductor laser optical system, as an embodiment of the second laser optical system in accordance with the present invention.

FIG. 9 shows a semiconductor laser optical system using a second laser optical system in accordance with a second embodiment of the present invention.

Referring to FIG. 9, a current is applied to a semiconductor laser 1, and the semiconductor laser 1 emits a laser beam 1A in an amount in accordance with the level of the current. The laser beam 1A generated by the semiconductor laser 1 is collimated by a collimator lens 2 disposed in the optical path, and then impinges upon a density distribution filter 23 which is constructed so that its optical density at the center portion is lower and the optical density at peripheral portions is higher, and such that only the low density portion substantially transmits light.

Figure 10A:
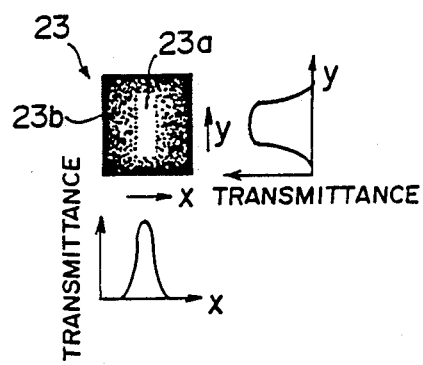
FIGS. 10A and 10B are schematic views showing examples of the density distribution filters and optical transmittances thereof.
Figure 10B:
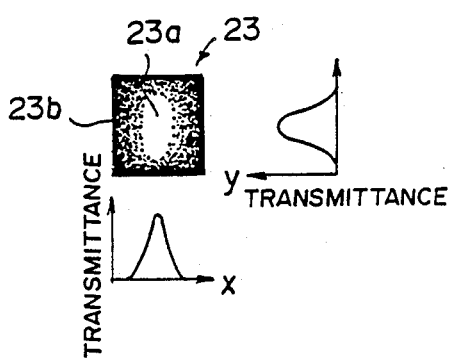
Figure 11:
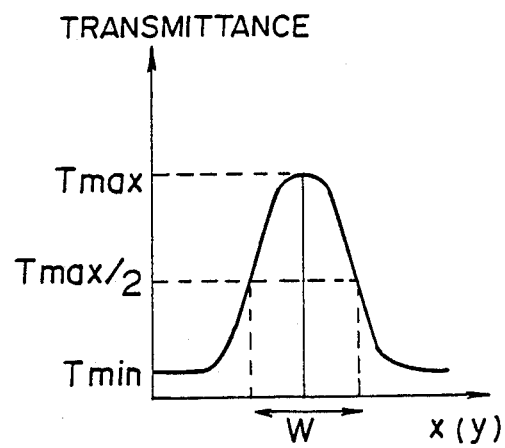
FIG. 11 is a graph showing the optical transmittance of the density distribution filter.

The density distribution filter 23 is used for decreasing the diameter of the convergence spot of the laser beam in the low output region, wherein the natural emission light is predominant, to a value close to the diameter of the convergence spot of the laser oscillation light. The diameter of the convergence spot of the laser beam in the low output region can be made smaller as the size of the low density portion is made smaller to decrease the diameter of the laser beam passing through the low density portion. By way of example, the density distribution filter 23 is constituted as shown in FIG. 10A so that a rectangular low density portion 23a is formed inwardly from a high density portion 23b, which substantially intercepts light. The optical transmittance of the density distribution filter 23 in the transverse direction (i.e. in the x direction) and the optical transmittance thereof in the longitudinal direction (i.e. in the y direction) are as shown in FIG. 10A. The sizes of the low density portion 23a in the x direction and in the y direction are smaller than the beam diameter of the laser light. The low density portion 23a may have any shape insofar as the longitudinal and transverse widths are suitable for taking up the laser beam of a desirable diameter. For example, the shape of the low density portion 23a may be elliptical as shown in FIG. 10B. In the case where the shape of the low density portion 23a is elliptical, the optical transmittance of the density distribution filter 23 in the x direction and the optical transmittance thereof in the y direction become as shown in FIG. 10B. Also, the density distribution of the density distribution filter 23 need not be such that the low density portion and the high density portion are continuously changed gradually as mentioned above, and may be such that the density decreases stepwise toward the center of the filter. In any case, as shown in FIG. 11, the maximum value Tmax and the minimum value Tmin of the transmittance of the density distribution filter 23 should preferably be different from each other by at least one order of magnitude. The density distribution of the filter need not be formed in two dimensions, and may be formed only in one dimension in the case where problems with regard to an increase in the diameter of the convergence spot of the natural emission light and the like are allowable in one direction.

Figure 12:
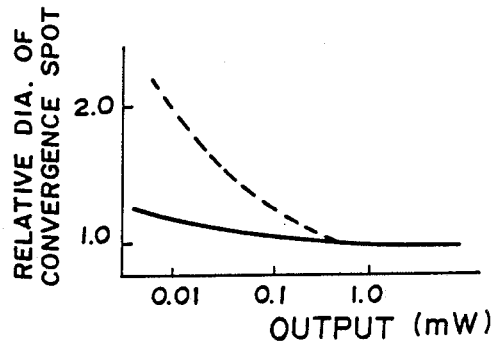
FIG. 12 is a graph showing the relationship between the optical output and the diameter of a convergence spot in the case where the density distribution filter is provided in comparison with the relationship in the case where no density distribution filter is provided.

As shown in FIG. 9, the laser beam 1A' passing through the density distribution filter 23 is converged by the converging lens 4 to a predetermined convergence position Q. In the case where the density distribution filter 23 is not disposed in the optical path of the laser beam 1A emitted by the semiconductor laser 1, the relationship between the output of the semiconductor laser 1 and the diameter of the convergence spot becomes as indicated by the broken line in FIG. 12. On the vertical axis of the graph shown in FIG. 12, the diameter of the convergence spot is shown relative to the diameter of the convergence spot at an output of 3 mW wherein substantially only the laser oscillation light is generated, the latter value being taken as 1. Thus in the case where the density distribution filter 23 is not used, the diameter of the convergence spot of the laser beam in the low output region wherein only the natural emission is generated or the natural emission light is predominant becomes very large. However, with this embodiment of the laser optical system in accordance with the present invention, the diameter of the convergence spot of the laser beam in the low output region can be reduced by the effects of the density distribution filter 23. Specifically, in the case where each of the longitudinal width W and the transverse width W of the portion of the density distribution filter 23 corresponding to the transmittance range from the maximum value Tmax to one-half of the maximum value Tmax, i.e. Tmax/2, in the optical transmittance distribution as shown in FIG. 11 is, for example, 0.6 times the diameter (half width) of the laser beam 1A incident upon the density distribution filter 23 after being collimated by the collimator lens 2, the relationship between the output of the semiconductor laser 1 and the diameter of the convergence spot becomes as indicated by the solid line in FIG. 12. Thus the diameter of the convergence spot can be made markedly smaller than in the conventional laser optical system in the low output region as well. Also, no side lobe is generated at the convergence position, and the converged beam constituted by the zero-order light component alone can be obtained.

Though the density distribution filter 23 is disposed between the collimator lens 2 and the converging lens 4, the density distribution filter 23 may be disposed at any position in the optical path between the semiconductor laser 1 and the convergence position Q. Also, the density distribution filter 23 may be incorporated inside of the collimator lens or inside of the converging lens 4. The size of the low density portion of the density distribution filter 23 may be adjusted to a value suitable for the beam diameter of the incident laser beam in accordance with the location of the density distribution filter 23.

Figure 13:
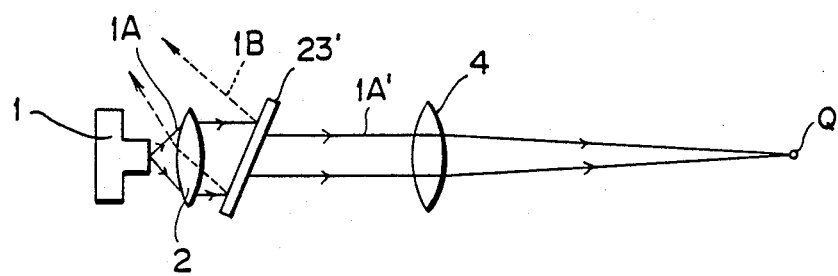
FIGS. 13 and 14 are side views showing semiconductor laser optical systems according to further embodiments of the second laser optical system in accordance with the present invention.

In the case where the density distribution filter 23 is positioned normal to the optical axis of the incident laser beam 1A as shown in FIG. 9, it may occur that a part of the laser beam 1A reflected by the surface of the density distribution filter 23 passes through the collimator lens 2 and returns to the semiconductor laser 1. When the reflected laser beam is returned to the semiconductor laser 1 in this manner, mode hopping occurs or the output of the semiconductor laser 1 is caused to fluctuate by optical interference. The adverse effects of returning of the reflected laser beam returning also arise in the cases of lasers other than semiconductor lasers. For example, in the case of a gas laser such as a He-Ne laser too, interference noise is generated inside of the resonator by the returning laser beam, and therefore the output of the laser beam emitted by the laser fluctuates. Particularly in the case where the density distribution filter 23 is of the reflection type wherein the high density portion reflects the incident laser beam to restrict the passage of the laser beam, a large amount of the laser beam is reflected by the high density portion, and therefore the aforesaid adverse effects become large. To eliminate such problems, as shown in FIG. 13, a density distribution filter 23' may be positioned obliquely with respect to the optical axis of the laser beam 1A emitted by the semiconductor laser 1. With this configuration, the optical path of a laser beam 1B reflected by the density distribution filter 23' is shifted upward obliquely, so that no laser beam is returned to the semiconductor laser 1 and the aforesaid problems can be avoided. The density distribution (reflectivity distribution) of the density distribution filter 23' may be adjusted to an appropriate condition in accordance with the angle of inclination of the density distribution filter 23'.

Figure 14:
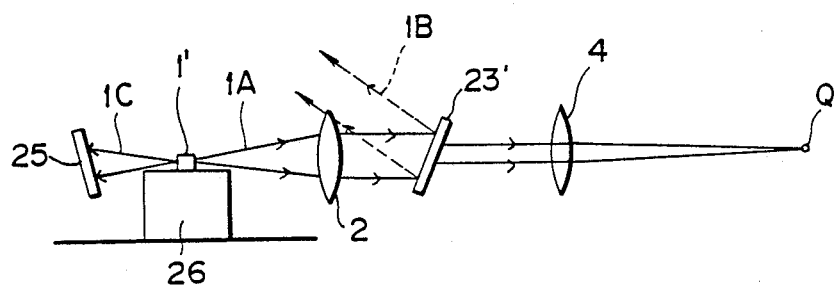

Also in the optical system as shown in FIG. 14 wherein the optical output of a semiconductor laser is automatically controlled by use of a photodetector 25, it is often desired to position the density distribution filter 23' obliquely. Specifically, in the optical system shown in FIG. 4, a semiconductor laser chip 1' supported by a supporting base 26 is disposed so that a laser beam 1C emitted from the back of the semiconductor laser chip 1' is detected by the photodetector 25. The photodetector 25 controls the drive current for the semiconductor laser chip 1' in accordance with the output of the laser beam 1C, so that the optical amount of the laser beam 1A emitted forward by the semiconductor laser chip 1' is always kept constant. In such an optical system, when the laser beam reflected by the reflection type density distribution filter 23' is returned toward the semiconductor laser chip 1', the returning laser beam interferes with the laser beam 1C, and the control cannot be carried out accurately. Accordingly, the density distribution filter 23' is inclined as shown to eliminate interference of the reflected laser beam 1B with the laser beam 1C and to carry out the automatic control of the laser power accurately.

An example of the optical scanning apparatus wherein the semiconductor laser optical system is used as the second laser optical system in accordance with the present invention will be described hereinbelow with reference to FIG. 15.

Figure 15:
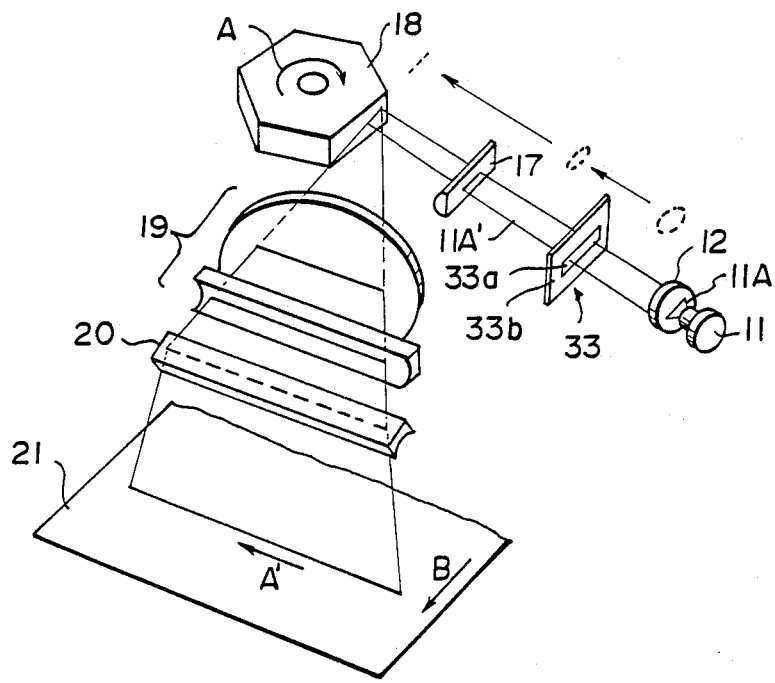
FIG. 15 is a perspective view showing an optical scanning apparatus wherein the second laser optical system in accordance with the present invention is utilized.

In FIG. 15, a laser beam 11A emitted by a semiconductor laser 11 is collimated by a collimator lens 12, and is then made to impinge upon a density distribution filter 33. The density distribution filter 33 is of the light absorbing type, and is therefore disposed normal to the optical axis of the laser beam 11A. The laser beam 11A has a horizontally long elliptical beam shape as indicated by the broken line in FIG. 15, and a low density portion 33a formed inwardly from a high density portion 33b of the density distribution filter 33 is provided to restrict the passage of the laser beam 11A therethrough only in the shorter axis direction (i.e. in the vertical direction in FIG. 15). Therefore, laser beam 11A' passing through the density distribution filter 33 has its beam shape contracted vertically as compared with the beam shape of the laser beam 11A. The laser beam 11A' passing through the density distribution filter 33 is converged by a cylindrical lens 17, which is disposed in the optical path, only in the vertical direction. The laser beam 11A' is thus made to impinge upon a rotating polygonal mirror 18, which is rotating in the direction as indicated by the arrow A, as a linear image normal to the drive axis of the rotating polygonal mirror 18. The rotating polygonal mirror 18 reflects and deflects the laser beam 11A' in a main scanning direction, and the deflected laser beam 11A' is passed through an fθ lens 19 constituted by a combination of two lenses. The deflected laser beam 11A' is then passed through a cylindrical mirror 20 disposed in the optical path to extend in the main scanning direction, and repeatedly scans a surface 21, which is being conveyed in a sub-scanning direction as indicated by the arrow B, in the main scanning direction indicated by the arrow A'. The cylindrical mirror 20 converges the incident laser beam 11A' only in the sub-scanning direction on the surface 21 which is to be scanned, and the distance between the fθ lens 19 and the surface 21 which is to be scanned is adjusted to be equal to the focal length of the fθ lens 19 as a whole. Thus in this optical scanning apparatus, the cylindrical lens 17 and the cylindrical mirror 20 are disposed, and the laser beam 11A' is converged onto the rotating polygonal mirror 18 only in the sub-scanning direction. Therefore, even though surface inclination or axis deviation arises with the rotating polygonal mirror 18, the scanning position of the laser beam 11A' on the surface 21 which is to be scanned does not deviate in the sub-scanning direction, and scanning lines free of splits in the sub-scanning direction can be formed at equal intervals. Also, in such an optical scanning apparatus, high accuracy of the diameter of the convergence spot on the surface 21 is required, particularly in the sub-scanning direction. In the optical scanning apparatus shown in FIG. 15, the diameter of the convergence spot is adjusted in the vertical direction, which corresponds to the sub-scanning direction, by the density distribution filter 33 placed in the optical path prior to the impingement of the laser beam 11A' upon the mirror 18 as mentioned above, and therefore the problem with regard to beam blur in the sub-scanning direction does not arise. Also, in the adjustment of the diameter of the convergence spot, carried out by the density distribution filter 33, the laser beam 11A is not completely eclipsed in the course of the adjustment. Therefore, no side lobe is generated on the surface 21 which is to be scanned and on which the laser beam 11A' is converged. Accordingly, scanning can be carried out accurately on the surface 21 so that no beam diameter blur appears in the sub-scanning direction and no side lobe is generated.

Though the embodiment of the second laser optical system in accordance with the present invention is described above using a semiconductor laser optical system as an example, the second laser optical system in accordance with the present invention can employ other laser optical systems wherein the beam diameter is to be restricted for the purpose of increasing the focal depth or for other purposes, and the laser beam source is not limited to semiconductor lasers. Also, the desirable density distribution of the density distribution filter varies in accordance with the purpose of the adjustment of the beam diameter. In the case where the diameter of the collimator lens is adjusted to be smaller than, for example, the diameter of the incident laser beam, the collimator lens as a whole acts in the same manner as an aperture, and part of the laser beam is eclipsed by the collimator lens. However, when the density distribution filter is disposed in the optical path in such an optical system, the density distribution filter can achieve the effects of cutting off the eclipsed laser beam and preventing the generation of side lobes as well as its original purposes.

I claim:
1. A laser optical system comprising:
(i) a laser beam source,
(ii) a beam diameter adjusting member disposed in an optical path of a laser beam emitted by said laser beam source and having an aperture through which only the center portion of said laser beam is passed,
(iii) a converging lens for converging the laser beam passed through said aperture of said beam diameter adjusting member, and
(iv) a spatial filter disposed proximate a convergence position of said laser beam for restricting the passage of said laser beam in at least one direction perpendicular to an axis of said beam and allowing passage of only a zero-order light component.

2. A laser optical system as defined in claim 1 wherein said laser beam source is a semiconductor laser and emits (1) light in a natural light emission region and (2) laser oscillation light, both in quantities which vary with the level of an applied current, and the size of said aperture of said beam diameter adjusting member in a longitudinal direction and the size thereof in a transverse direction are respectively within a range of 0.2 to 1.5, where the value 1.0 represents the size of an aperture which passes laser oscillation light within a range from maximum intensity L to intensity L/2 in an intensity distribution of laser oscillation light in accordance with the radiation angle thereof.

3. A laser optical system as defined in claim 1 or 2 wherein said spatial filter is constituted by a light-shielding plate provided with an aperture, and at least the width of said aperture of said spatial filter in one direction is within a range of W + W/10 wherein W denotes the distance between dark points P present between said zero-order light component and a first-order light component.

4. A laser optical system comprising:
(i) a laser beam source, and (ii) a density distribution filter disposed in an optical path of a laser beam emitted by said laser beam source for restricting passage of said beam in at least one direction perpendicular to the axis of said beam so that only the center portion of said laser beam in said at least one direction can pass, said filter gradually decreasing in optical transmittance toward peripheral portions of said laser beam.

5. A laser optical system as defined in claim 4 wherein said laser beam source is a semiconductor laser.

6. A laser optical system as defined in claim 4 or 5 wherein said density distribution filter is formed so that a maximum value Tmax and a minimum value Tmin of the optical transmittance are different from each other by at least a factor of ten.

7. A laser optical system as defined in claim 4 or 5 wherein said density distribution filter is inclined by a predetermined angle with respect to the optical path of said laser beam.

* * * * *